(12) United States Patent  
Silverstein et al.

(10) Patent No.: US 10,685,180 B2  
(45) Date of Patent: Jun. 16, 2020

(54) USING REMOTE WORDS IN DATA STREAMS FROM REMOTE DEVICES TO AUTOCORRECT INPUT TEXT

(71) Applicant: International Business Machines Corporation, Armonk, NY (US)

(72) Inventors: Zachary Silverstein, Austin, TX (US); Mark Delaney, Raleigh, NC (US); Robert H. Grant, Atlanta, GA (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/976,791

(22) Filed: May 10, 2018

(65) Prior Publication Data

US 2019/0347322 A1 Nov. 14, 2019

(51) Int. Cl.
*G06F 40/232* (2020.01)
*G06F 40/274* (2020.01)
*G06F 16/387* (2019.01)
*G06F 3/0482* (2013.01)

(52) U.S. Cl.
CPC .......... *G06F 40/232* (2020.01); *G06F 3/0482* (2013.01)

(58) Field of Classification Search
CPC .. G06F 17/273; G06F 17/2735; G06F 17/276; G06F 40/232; G06F 16/387; G06F 16/489; G06F 16/5866; G06F 16/686; G06F 16/7867
USPC ........... 704/1, 9, 10; 715/257, 259; 707/724, 707/725
See application file for complete search history.

(56) References Cited

U.S. PATENT DOCUMENTS

| 9,977,779 | B2 * | 5/2018 | Winer | G06F 17/2735 |
| 2005/0125217 | A1 * | 6/2005 | Mazor | G06F 17/273 704/1 |
| 2007/0038615 | A1 * | 2/2007 | Vadon | G06F 17/273 |
| 2008/0155398 | A1 * | 6/2008 | Bodin | G06F 17/273 715/257 |

(Continued)

FOREIGN PATENT DOCUMENTS

| EP | 3201757 A1 | 8/2017 |
| WO | 2008065549 | 6/2008 |

OTHER PUBLICATIONS

S. Frey, "An Analysis of Autocorrect", dated Jun. 26, 2016, (online) retrieved from the Internet at URL> https://medium.com/@sarthfrey/https-medium-com-prcobol-the-anatomy-o, Total 7 pages.

(Continued)

*Primary Examiner* — Martin Lerner
(74) *Attorney, Agent, or Firm* — David W. Victor; Konrad, Raynes, Davda and Victor LLP

(57) ABSTRACT

Provided are a computer program product, system, and method for using remote words in data streams from remote devices to autocorrect input text. Remote words included in a at least one data stream are accessed from at least one remote device over a network to store in a remote word corpus. User input text is received in a text entry field in a user interface rendered by the computer device. Local words are maintained in a local word corpus stored in the computer device. The local words and the remote words are used to autocorrect and validate the user input text.

21 Claims, 6 Drawing Sheets

(56) References Cited

U.S. PATENT DOCUMENTS

| | | | |
|---|---|---|---|
| 2010/0114887 A1* | 5/2010 | Conway | G06F 40/274 707/737 |
| 2012/0117101 A1* | 5/2012 | Unruh | G06F 17/273 707/765 |
| 2013/0311179 A1 | 11/2013 | Wagner | |
| 2015/0187355 A1 | 7/2015 | Parkinson et al. | |
| 2015/0205857 A1 | 7/2015 | Yuen et al. | |
| 2016/0078103 A1 | 3/2016 | Novik et al. | |
| 2016/0092598 A1 | 3/2016 | Mishra | |
| 2016/0170960 A1* | 6/2016 | Hochman | G06F 17/273 715/257 |
| 2018/0158061 A1* | 6/2018 | Edelstein | G06Q 20/4016 |
| 2018/0173692 A1* | 6/2018 | Greenberg | G06F 17/276 |
| 2018/0188823 A1* | 7/2018 | Dunne | G06F 40/232 |
| 2018/0188824 A1* | 7/2018 | Dunne | G06F 40/232 |

OTHER PUBLICATIONS

Wikipedia, "Autocorrection", dated Apr. 15, 2018, (online), retrieved from the Internet at URL>https://en.wikipedia.org/wiki/Autocorrection, total 2 pages.

A. De La Costa, "How to Make Your Own Autocorrect for Your Apple Devices", (online) retrieved from the Internet on Apr. 26, 2018, at URL> https://snapguide.com/guides/make-your-own-autocorrect-for-apple-devices/, Total 6 pages.

F. Manjoo, "How You Cell Phone's Autocorrect Software Works, and Why Its Getting Better", dated Jul. 13, 2010, (online) retrieved from the Internet at URL>http://www.slate.com/articles/technology/technology/2010/07/yes_ill_mat . . . Total 5 pages.

LexAble, (online), retrieved from the Internet on Apr. 26, 2018, at URL>https://www.lexable.com/features/, Total 3 pages.

US Patent Application, dated Nov. 22, 2017, for U.S. Appl. No. 15/820,619, filed Nov. 22, 2017.

* cited by examiner

Local Word

Remote Word

Possible Correct Word

USING REMOTE WORDS IN DATA STREAMS FROM REMOTE DEVICES TO AUTOCORRECT INPUT TEXT

BACKGROUND OF THE INVENTION

1. Field of the Invention

The present invention relates to a computer program product, system, and method for using remote words in data streams from remote devices to autocorrect input text.

2. Description of the Related Art

Autocorrect technologies provide replacement words for user inputted text when the user inputted text does not match a word in a word corpus at the computer device in which the user is inputting text. The autocorrect program performs an auto spell check to automatically correct the spelling of user input text based on a corpus of recognized words in a language. The autocorrect program may also determine words at an edit distance from the user input text and then determine a probability value or relevancy score for the determined words within the edit distance indicating the likelihood the word within the edit distance is the correct word for the user input text.

There is a need in the art for improved techniques for determining correct words to autocorrect and validate user entered text.

SUMMARY

Provided are a computer program product, system, and method for using remote words in data streams from remote devices to autocorrect input text. Remote words included in a at least one data stream are accessed from at least one remote device over a network to store in a remote word corpus. User input text is received in a text entry field in a user interface rendered by the computer device. Local words are maintained in a local word corpus stored in the computer device. The local words and the remote words are used to autocorrect and validate the user input text.

DETAILED DESCRIPTION

Autocorrect programs assist users in correcting the spelling of text being entered in a user interface. However, users often use vernacular, slang and short hand terms and codes that are not represented in a local dictionary used for autocorrect. Further, the words the user is intending to enter may be currently rendered in proximate devices to the user, such as televisions, field voice controllers, and other electronic devices available via the Internet of Things. There is a need in the art to incorporate into the autocorrect corpus words from proximate devices in an Internet of Things to increase the likelihood of properly correcting or validating user input text with the user intended word and to not be limited by the words in the local corpus.

Described embodiments provide improvements to computer technology for autocorrect programs by incorporating into the word corpus remote words from a remote data stream from remote network devices over a network. Upon receiving user input text in a text entry field, both local words from a local word corpus and remote words from the remote word corpus are used to autocorrect and validate the user input text. In this way, the autocorrect is more likely to validate or autocorrect user input text with the correct intended word by incorporating words being rendered in remote devices that may be rendering terms from an expanded corpus used by the particular user.

Further, embodiments improve the computer technology for calculating a relevancy score for remote words in a set of possible correct words that differ from the user input text by an edit distance by considering attributes of the remote device from which the remote word originated that could affect relevancy. Embodiments may increase the autocorrect relevancy score for remote words that are from remote devices that are physically closer to the user computing device because such closer remote device providing the remote word may be more likely to have been observed by the user. Further, remote words that have been more recently rendered at the remote device would further increase the relevancy score because the user input text is more likely to be related to remote words rendered closer in time to when the user entered the input text. Still further, the relevancy score of possible correct remote words may also be increased for remote words found more frequently in remote data streams from remote devices. In this way, remote words from remote devices may be used to supplement the corpus used to determine possible correct words for user input text and to modify the relevancy score of remote words based on attributes of the remote devices and the remote words rendered at the remote devices.

Figure 1:
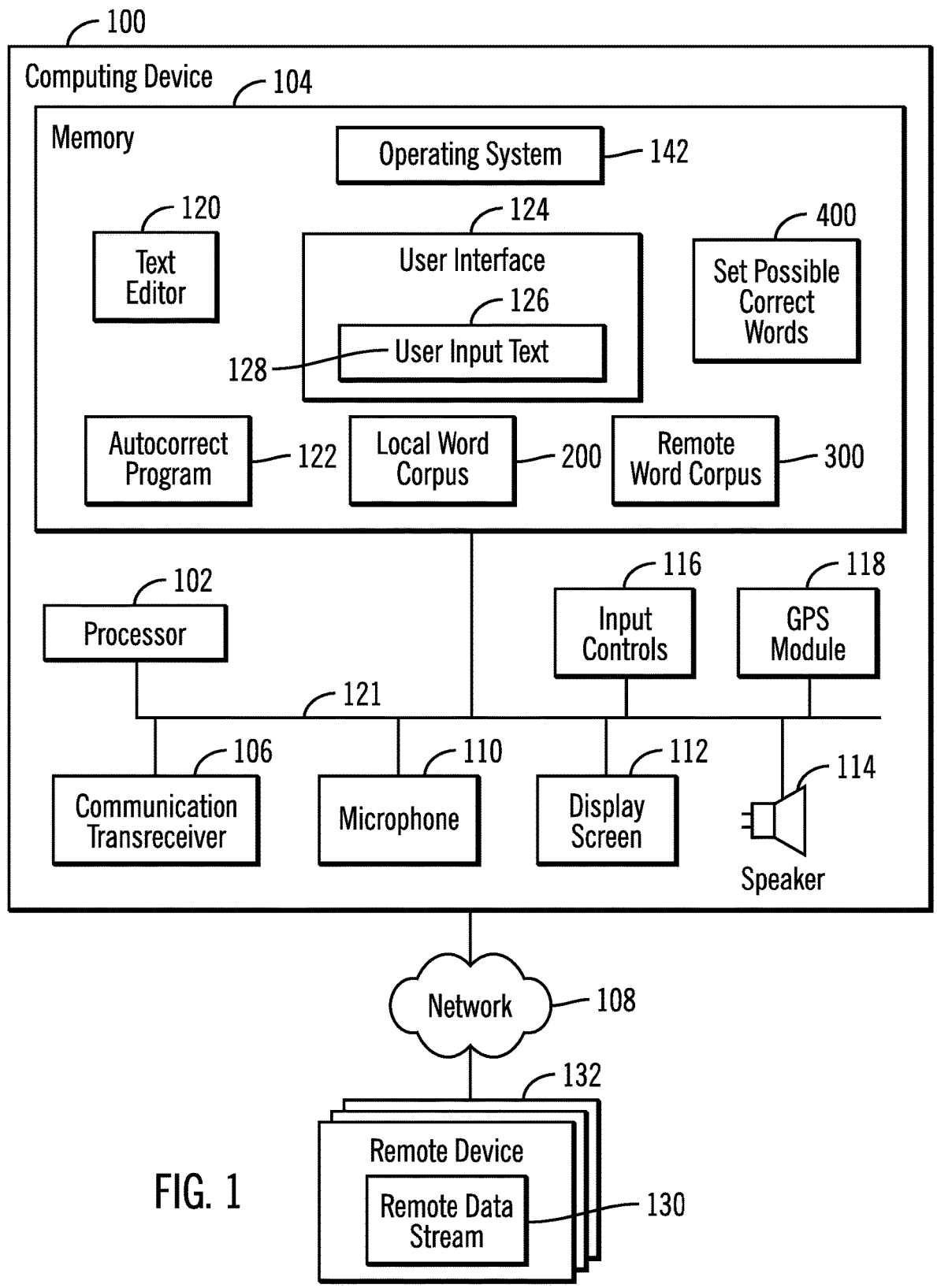
FIG. 1 illustrates an embodiment of an autocorrect computing environment.

FIG. 1 illustrates an embodiment of a computing device 100 including a processor 102, a main memory 104, and a communication transceiver 106 to communicate (via wireless communication or a wired connection) with remove devices over a network 108, such as the Internet, a cellular network, etc.; a microphone 110 to receive as input sound or user voice input to the personal computing device 100; a display screen 112 to render display output to a user of the personal computing device 100; a speaker 114 to generate sound output to the user; input controls 116 such as buttons and other software or mechanical buttons, to receive user input; and a global positioning system (GPS) module 118 to determine a GPS position of the personal computing device 100. The components 102-118 may communicate over one or more bus interfaces 121.

The main memory 104 may include various program components including a text editor 120 in which the user may enter text and an autocorrect program 122 to autocorrect the user input. The text editor 120 may render a user interface 124, displayed on the display screen 112, that renders a user input field 126 in which to receive user input text 128 to form a word.

The text editor 120 may comprise a standalone word processor or be part of another application, such as a messaging application, email client, notes or task manager application, social network application, etc. The autocorrect program 122 may be included within the text editor 120 code or may comprise a separate program or operating system library function called by the text editor 120 and any other text editing program or application in the computer device 100.

The autocorrect program 122 may determine possible correct words for the user input text 128 from a local word corpus 200 maintained locally in the computing device 100 and a remote word corpus 300 including words from remote data streams 130 generated in remote devices 132 that are accessible over the network 108. The autocorrect program 122 includes code that when executed is to validate text 128 the user enters as a recognized word and provide autocorrect suggestions or a set of possible correct words 400 based on an edit distance, such as the Damerau-Levenshtein edit distance, between the user input text 128 and words in the corpus 200, 300. The autocorrect program 122 may further calculate a relevancy score for each of the possible correct words within the edit distance indicating the likelihood a possible correct word is the correct word intended by the user input text. The autocorrect program 122 may use various techniques to determine the relevancy score, such Bayesian probability, principle component analysis (PAC), and other suitable techniques for determining a relatedness of a possible correct words from a corpus to user input text 128 that does not form a recognized word in the corpuses 200, 300.

A data stream 130 generated at a remote device 132 may include words as they are rendered or processed at the remote device 132, along with a time the word was added to the data stream 130. The autocorrect program 122 may access the remote data streams 130 over the network 108 and include the words from the remote data streams 130 into the remote word corpus 300 to use for possible correct words for auto-correction operations. For instance, if the remote device 132 comprises a television or cable box, then the remote data stream 130 may include terms from the current guides being rendered in the cable box, words in closed caption subtitles for programs, and words rendered in the program descriptions as programs are selected by the user. The remote device 132 may further comprise an appliance in the room or building in which the user is located, such as an office or home, and may comprise a device part of the Internet of Things. The remote device 132 may also comprise a far field voice control device to allow a user to use natural language expressions via voice to control hardware devices, access online cloud services, etc., such as Amazon® Alexa®. (Amazon and Alexa are registered trademarks of Amazon Technologies, Inc. throughout the world)

The main memory 104 may further include an operating system 142 to manage the personal computing device 100 operations and interface with device components 102 and 106-118.

The computing device 100 may comprise a smart phone, personal digital assistance (PDA), wearable computer, laptop computer, desktop computer, network appliance, or device part of the Internet of Things (IoT). The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 121 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 120, 122, 124, 142, etc., may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal computing device 100 and remote devices 132 of FIG. 1 may be implemented in one or more computer systems, where if they are implemented in multiple computer systems, then the computer systems may communicate over a network.

The program components 120, 122, 124, 142 may be accessed by the processor 102 from the memory 104 to execute. Alternatively, some or all of the program components 120, 122, 124, 142 may be implemented in separate hardware devices, such as Application Specific Integrated Circuit (ASIC) hardware devices.

The functions described as performed by the program components 120, 122, 124, 142 may be implemented as program code in fewer program modules than shown or implemented as program code throughout a greater number of program modules than shown.

Figure 2:
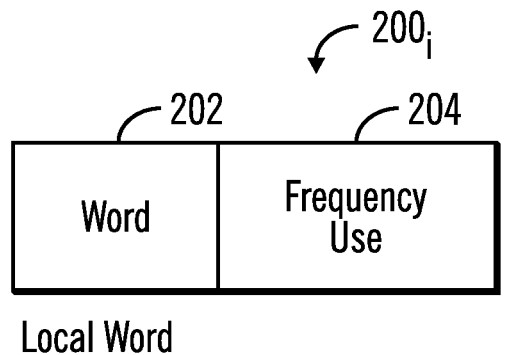
FIG. 2 illustrates an embodiment of a local word in a local word corpus.

FIG. 2 illustrates an embodiment of a local word entry 200$_i$ in the local word corpus 200, and includes an established word 202, such as a word in a language, and a frequency of use 204 of the word, indicating a number of times the word was used within a time interval. The local word corpus 200 may be included with the autocorrect program 122 and updated with updates to the autocorrect program 122.

Figure 3:
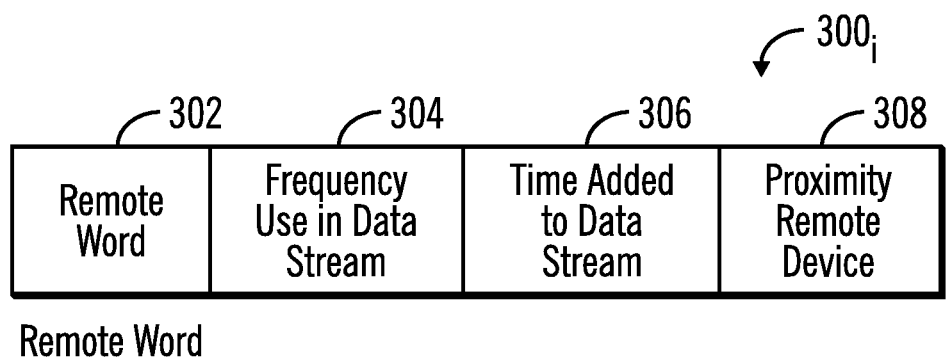
FIG. 3 illustrates an embodiment of a remote word from a remote network device in a remote word corpus.

FIG. 3 illustrates an embodiment of a remote word entry 300$_i$ in the remote word corpus 300 including a remote word 302 captured from the remote data stream 130 from a remote device 132; a frequency of use 304 in one or more data streams 130 of the word; a time the word was added to a data stream 306, which may comprise a most recent time if the word has been in multiple data streams 130; and a proximity to a remote device 308 having the most recent data stream 130 from which the word was captured. The information in fields 304, 306, and 308 on the remote word 302 may be used to adjust the relevancy score for remote words being considered as possible correct words for user input text 128. For instance, words more frequently used in one or more data streams 130 will increase the relevancy score for the word 302, words added more recently to a data stream 130, as indicated by the time 306, will also increase the relevancy score for the word 302, and words captured from a remote device 132 closer in distance to the computing device 100 will also increase the relevancy score. The reason being is that devices more proximate to the user are more likely to be rendering words the user has recently perceived, remote words more recently rendered are likely to have been perceived by the user when entering the input text, and more frequent words in the data stream of the remote devices 132 are also more likely to be words likely to be the topic of the user input text.

Figure 4:
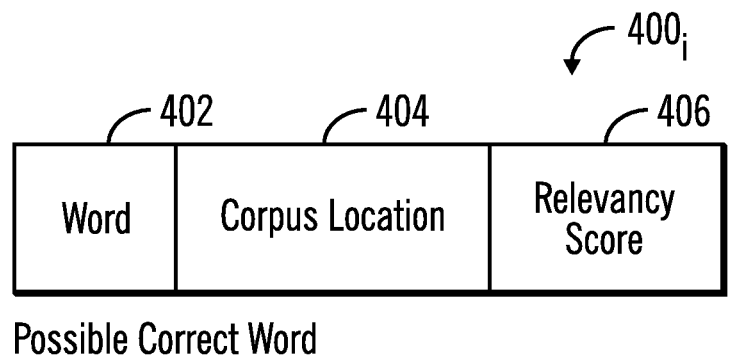
FIG. 4 illustrates an embodiment of a possible correct word in a set of possible correct words to use to autocorrect user input text.

FIG. 4 illustrates an instance of a possible correct word 400, in the set of possible correct words 400 determined to be an edit distance from user input text 128, and includes the word 402, a corpus location 404 in the corpus 200, 300 including the possible correct word, and a calculated relevancy score 406, based on relevancy to the user input text 128, such as a statistical relevancy, e.g., naive Bayesian score.

Figure 5:
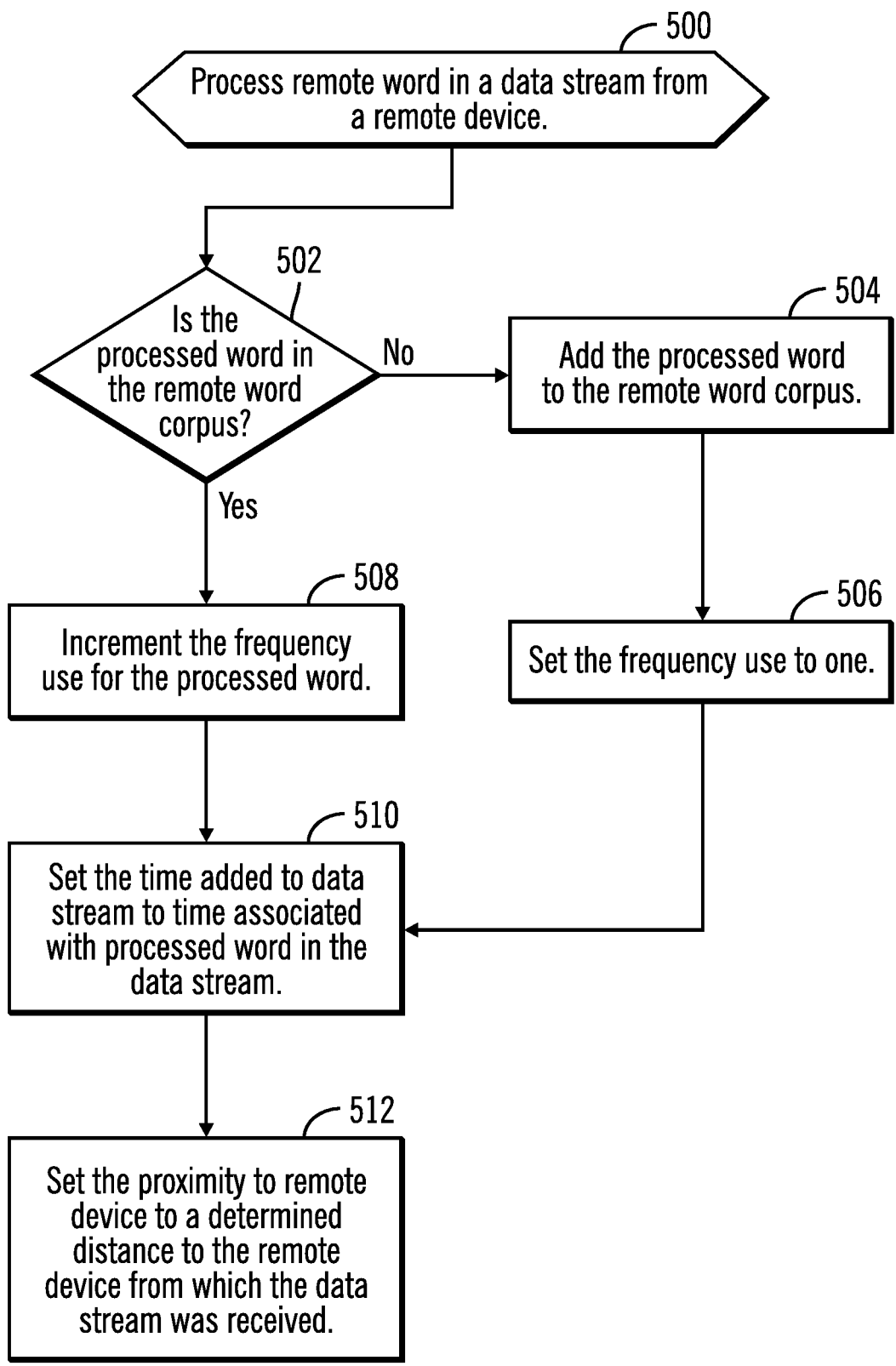
FIG. 5 illustrates an embodiment of operations to process a remote word in a remote data stream from a remote network device.

FIG. 5 illustrates an embodiment of operations performed by the autocorrect program 122 to process a word (at block 500) in a remote data stream 130 received from a remote device 132. If (at block 502) the processed word from the data stream 130 is not in the remote word corpus 300, then the processed word is added (at block 504) as an instance $300_i$ to the remote word corpus 300 and the frequency 304 is set (at block 506) to one. If (at block 502) the processed word is in the remote word corpus 300 as an entry $300_i$, then the autocorrect program 122 increments (at block 508) the frequency use 304. After setting the frequency use 304 at block 506 or 508, the time added to the data stream 306 is set (at block 510) to a time associated with the word in the data stream 130, such as metadata for the data stream 130 indicating a time the processed word was added to the remote data stream 130 or processed in the remote device 132. The proximity to the remote device 308 is set (at block 512) to a determined distance of the computing device 100 to the remote device 132 that transmitted the data stream 130 having the processed word. The proximity 308 may be determined from Global Positioning System (GPS) information received from the remote device 132 with the data stream 130 and the GPS information for the computing device 100 received from the GPS module 118.

With the embodiment of FIG. 5, remote words in a data stream generated at a remote device 132 within proximity to the user that have been rendered or processed in the remote device are added to the remote word corpus 300 along with metadata indicating a relevancy of the word, such as the frequency of use in one or more data streams 130 from one or more remote devices 132, a temporal indicator of how recently the word was used, and the proximity to the device. This metadata indicates a likelihood that a user had observed a word in a remote device 132 because words that are more frequently rendered, that have been more recently rendered, and that have been rendered closer in proximity to the user are more likely to have been observed by a user than words having the opposite of those attributes, such as words less frequently rendered, not recently rendered, and rendered in devices not within relative proximity to the user. Thus, the gathered information on remote rendering attributes of remote words may be used to adjust the relevancy score of remote words received from remote devices 132 as described below.

Figure 6A:
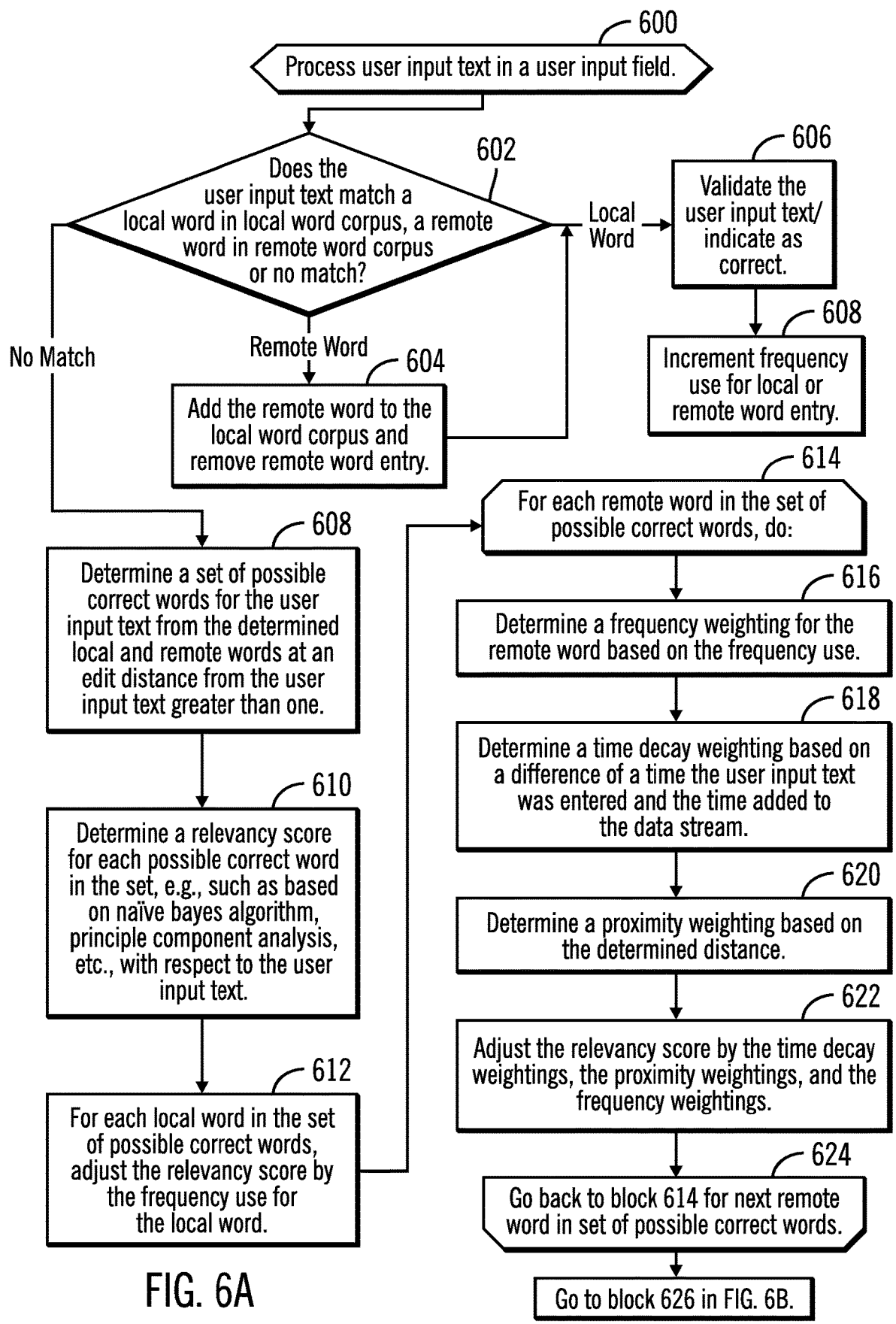
FIGS. 6*a* and 6*b* illustrate an embodiment of operations to use the local and remote word corpuses to validate and autocorrect user input text.
Figure 6B:
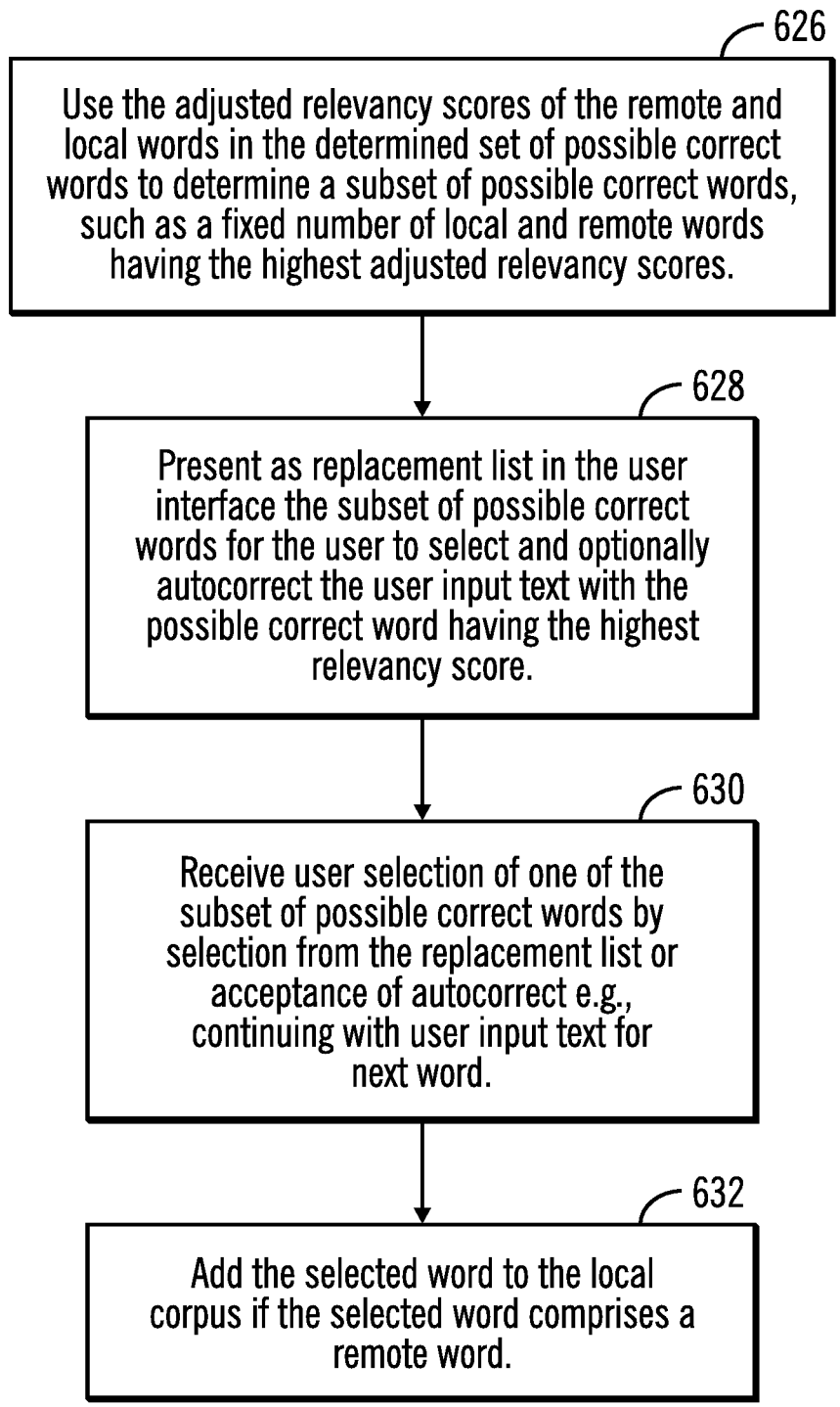

FIGS. 6a and 6b illustrate an embodiment of operations performed by the autocorrect program 122 to use the words in the local word corpus 200 and remote word corpus 300 to validate user input text 128 in the user input field 126 and provide suggested correct words if the user input text 128 does not match a word in the local 200 and remote 300 word corpuses. Upon processing (at block 600) user input text 128 in the user input field 126, the autocorrect program 122 determines (at block 602) whether the user input text 128 matches a local word $200_i$ in the local word corpus 200, a remote word $300_i$ in the remote word corpus 300 or no match with any word in either corpus 200, 300. If (at 602) the user input text 128 matches a remote word $300_i$, the matching remote word 302 is added to the local word corpus as a local word entry $200_i$ indicating the remote word as local word 202 and a frequency use 204 set to the remote use frequency 304. The remote word entry $300_i$ may then be removed from the remote corpus 300 after the word is added to the local corpus 200. After adding the matching remote word to the local word corpus 200 (at block 604) or if the user input text 128 matches a local word $200_i$ in the local word corpus 200 (from the local word branch of block 602), the autocorrect program 122 validates (at block 606) the user input text 128, such as indicate correct or accept. The frequency use 204, 304 in the local word entry $200_i$ or remote word entry $300_i$ is incremented (at block 608).

If (at block 602) there is no match of the user input text 128 with a word in the local 200 and remote 300 word corpus, then the autocorrect program 122 determines (at block 608) a set of possible correct words 400 for the user input text 128 from the determined local 200 and remote 300 words at an edit distance from the user input text greater than one. The set of possible correct words 400 may comprise words in the corpuses 200 and 300 that are an edit distance from the user input text 128 formed by modifying or adding a letter to the user input text 128, such as a Damerau-Levenshtein edit distance. The autocorrect program 122 determines (at block 610) a relevancy score 406 for each possible correct word 400, in the set, e.g., such as based on naïve Bayes algorithm, principle component analysis, etc, with respect to the user input text 128. For each local word $200_i$ in the set of possible correct words, the relevancy score 406 of the word is adjusted (at block 612) by a frequency weighting based on the frequency use 204 for the local word $200_i$.

For each remote word in the set of possible correct words 400 in a remote corpus, the autocorrect program 122 performs a loop of operations at blocks 614 through 624. At block 616, the autocorrect program 122 determines a frequency weighting for the processed word based on the frequency use 304. The autocorrect program 122 determines (at block 618) a time decay weighting based on a difference of a time the user input text 128 was entered and the time the word was added to the data stream 130. A proximity weighting is determined (at block 620) based on a determined distance of the computing device 100 and the remote device 132 from which the remote word was accessed. The autocorrect program 122 may then adjust (at block 622) the relevancy score 406 for the remote word 402 by the determined time decay weightings, the proximity weightings, and the frequency weightings.

A remote word having a higher frequency in the data streams 130 would increase the relevancy weighting because more frequently used words are more likely to be relevant to user input text. A remote word having a higher time decay weighting due to the remote word having a time 306 closer in time to the time the user input text 128 was entered would also likely be more relevant because it was rendered closer in time to the entry of the user input text 128. A remote word having a high proximity weighting due to being closer in distance to the remote device 132 would also likely be more relevant because that word was rendered closer to the computing device 100 and likely to be used or observed by the user.

Control then proceeds to block 626 in FIG. 6b where the autocorrect program 122 uses (at block 626) the adjusted relevancy scores 406 of the remote $300_i$ and local $200_i$ words in the determined set of possible correct words 400 to determine a subset of possible correct words, such as a fixed number of local and remote words having the highest adjusted relevancy scores. The fixed number may be based on a words that can be rendered in the displayed space of the user interface 124 rendered on the display screen 112. A user interface control may be provided to allow the user to scroll through further possible correct words. This subset of highly relevant possible correct words is presented (at block 628) as a replacement list in the user interface 124 for the user to select to replace the user input text 128 and optionally autocorrect the user input text 128 with the possible correct word having the highest relevancy score 406. The autocorrect program 122 receives (at block 630) user selection of one of the subset of possible correct words by direct selection from the replacement list or implicit acceptance by the user proceeding to enter text for a next word. The user selected word, such as directly or implicitly selected, may then be added (at block 632) to the local corpus 200 if the selected word comprises a remote word.

The described embodiments of FIGS. 6a and 6b expand the corpus of words available for word validation and auto-correction by considering words in data streams generated by remote devices. In this way the likelihood of a successful possible correct word suggestion is increased by utilizing words from remote devices with which the user is interacting and writing about. Further, the relevancy score of remote words may be weighted by a frequency of use in data streams in remote devices, a closeness or proximity of the remote devices to the computing device, and the time decay weightings, where the closer the remote word has been added to the data streams to the time the user entered the input text increases the relevancy score for that remote word because the user is more likely to be writing about words recently and more frequently presented at proximate remote devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
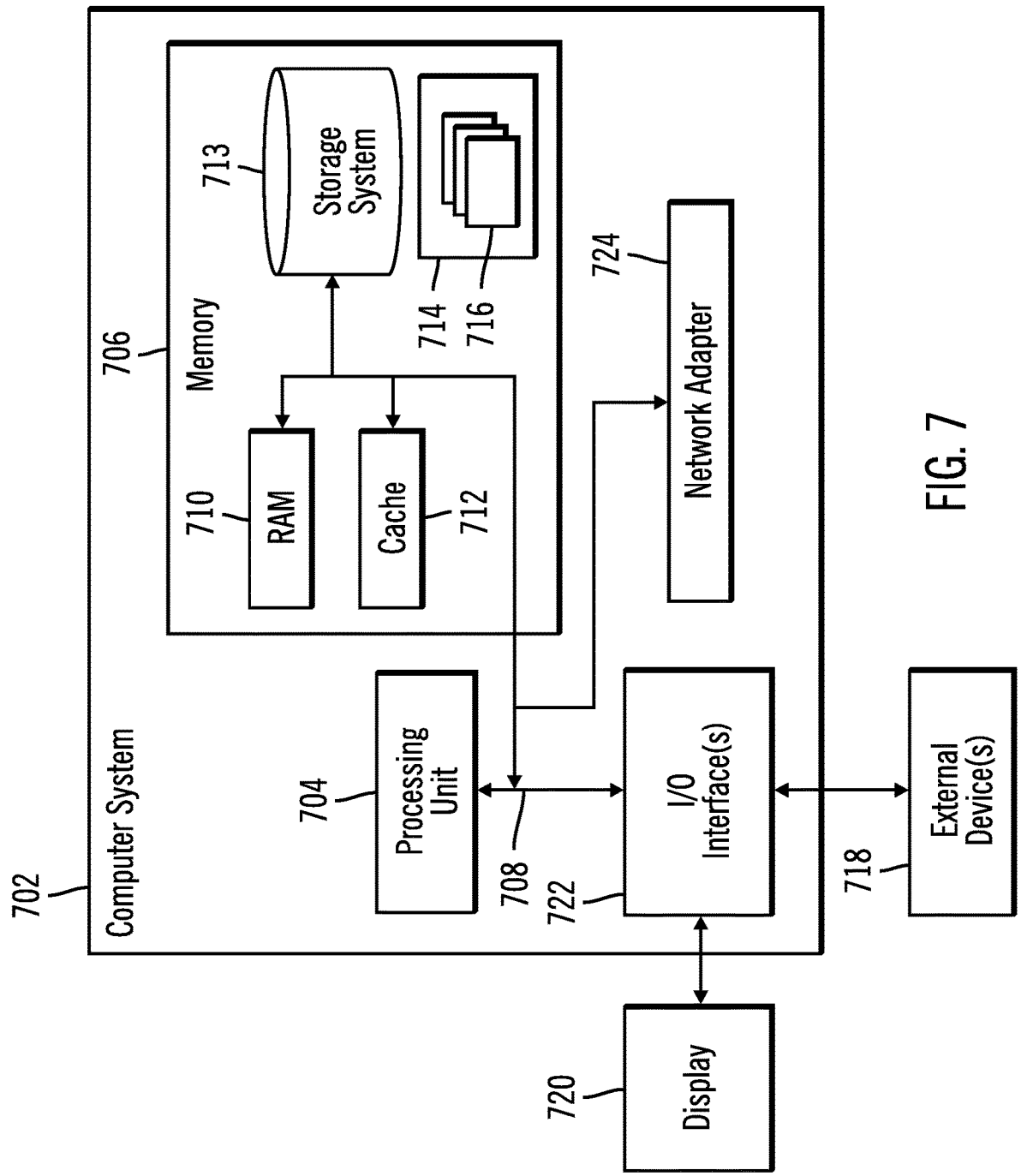
FIG. 7 illustrates a computing environment in which the components of FIG. 1 may be implemented.

The computational components of FIG. 1, including the computer system 100 and remote devices 132, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for autocorrecting text at a computer device and in communication with at least one remote device over a network, the computer program product comprising a computer readable storage medium having computer readable program code embodied therein that executes to perform operations, the operations comprising:

accessing remote words included in at least one data stream in the at least one remote device from over the network to store in a remote word corpus;

receiving user input text into a text entry field in a user interface rendered by the computer device;

maintaining local words in a local word corpus stored in the computer device;

determining a set of possible correct words for the user input text from the local and remote words;

determining relevancy scores of the local and remote words in the set of possible correct words;

determining a proximity weighting based on a distance between the remote device providing the data stream including the remote words and the computing device, wherein remote words from a data stream in a remote device having a smaller distance to the computing device have a higher proximity weighting than remote words in a remote device at a greater distance from the computing device;

adjusting the relevancy scores of the remote words in the set of possible correct words by the proximity weighting, wherein higher proximity weightings increases the relevancy scores of the remote words more than lower proximity weightings; and using the adjusted relevancy scores of the remote words to determine a subset of the set of possible correct words to present in the user interface to autocorrect and validate the user input text.

2. The computer program product of claim 1, wherein the using the local and remote words to validate the user input text comprises:

determining whether the user input text matches a local word in the local word corpus;

determining whether the user input text matches a remote word in the remote word corpus; and validating the user input text in response to determining that the user input text matches one of the local words or the remote words.

3. The computer program product of claim 1, wherein the using the local and remote words to autocorrect the user input text comprises:

rendering in the user interface at the computer device the subset of the set of possible correct words for a user to select for the user input text;

receiving user selection of a word comprising one of the subset of the set of possible correct words; and replacing the user input text with a user selected word of the subset of the set of possible correct words.

4. The computer program product of claim 3, wherein the operations further comprise:

including the user selected word in the local word corpus; and including a remote word from the at least one data stream into the local word corpus in response to the remote word matching the user input text.

5. The computer program product of claim 1, wherein the at least one data stream is formed by adding words rendered at the at least one remote device as the words are being rendered in the at least one remote device.

6. The computer program product of claim 1, wherein the operations further comprise:

determining, for each of the remote words in the set of possible correct words, a time decay weighting based on a difference of an entry time of the user input text and a remote processing time at which a remote word was added to the at least one data stream, wherein remote words having a lower difference value have a higher time decay weighting than remote words having a higher difference value; and determining, for each of the remote words in the set of possible correct words, a frequency weighting based on a number of instances of a remote word in the at least one data stream, wherein remote words having a higher frequency in the data stream have a higher frequency weighting than remote words having a lower frequency in the data stream, wherein the adjusting the relevancy scores of the remote words in the set of possible correct words by the proximity weighting comprises adjusting the relevancy scores by time decay weightings, proximity weightings, and frequency weightings determined for the remote words, wherein higher time decay weightings, higher proximity weightings, and higher frequency weightings increase relevancy scores of the remote words over lower than lower time decay weightings, lower proximity weightings, and lower frequency weightings, respectively.

7. The computer program product of claim 6, wherein the operations further comprise:
processing a remote word in a data stream from a remote device;
adding the processed remote word to a remote word corpus in response to the remote word corpus not including the processed remote word;
setting a frequency use for the processed remote word to one in response to adding the processed remote word to the remote word corpus;
incrementing the frequency use of the processed remote word in response to the remote word corpus already including the processed remote word;
setting a time for the processed remote word to a time the processed remote word was included in the data stream; and
setting a proximity to a distance between the computing device and the remote device providing the data stream including the processed remote word.

8. A system for autocorrecting text in communication with at least one remote device over a network, comprising:
a processor; and
a computer readable storage medium having computer readable program code embodied therein that when executed by the processor performs operations, the operations comprising:
accessing remote words included in at least one data stream in the at least one remote device from over the network to store in a remote word corpus;
receiving user input text into a text entry field in a user interface rendered at the system;
maintaining local words in a local word corpus stored in the system;
determining a set of possible correct words for the user input text from the local and remote words;
determining relevancy scores of the local and remote words in the set of possible correct words;
determining a proximity weighting based on a distance between the remote device providing the data stream including the remote words and the system, wherein remote words from a data stream in a remote device having a smaller distance to the system have a higher proximity weighting than remote words in a remote device at a greater distance from the system;
adjusting the relevancy scores of the remote words in the set of possible correct words by the proximity weighting, wherein higher proximity weightings increases the relevancy scores of the remote words more than lower proximity weightings; and using the adjusted relevancy scores of the remote words to determine a subset of the set of possible correct words to present in the user interface to autocorrect and validate the user input text.

9. The system of claim 8, wherein the using the local and remote words to validate the user input text comprises:
determining whether the user input text matches a local word in the local word corpus;
determining whether the user input text matches a remote word in the remote word corpus; and
validating the user input text in response to determining that the user input text matches one of the local words or the remote words.

10. The system of claim 8, wherein the using the local and remote words to autocorrect the user input text comprises:
rendering in the user interface the subset of the set of possible correct words for a user to select for the user input text;
receiving user selection of a word comprising one of the subset of the set of possible correct words; and
replacing the user input text with a user selected word of the subset of the set of possible correct words.

11. The system of claim 10, wherein the operations further comprise:
including the user selected word in the local word corpus; and
including a remote word from the at least one data stream into the local word corpus in response to the remote word matching the user input text.

12. The system of claim 8, wherein the at least one data stream is formed by adding words rendered at the at least one remote device as the words are being rendered in the at least one remote device.

13. The system of claim 8, wherein the operations further comprise:
determining, for each of the remote words in the set of possible correct words, a time decay weighting based on a difference of an entry time of the user input text and a remote processing time at which a remote word was added to the at least one data stream, wherein remote words having a lower difference value have a higher time decay weighting than remote words having a higher difference value; and
determining, for each of the remote words in the set of possible correct words, a frequency weighting based on a number of instances of a remote word in the at least one data stream, wherein remote words having a higher frequency in the data stream have a higher frequency weighting than remote words having a lower frequency in the data stream, wherein the adjusting the relevancy scores of the remote words in the set of possible correct words by the proximity weighting comprises adjusting the relevancy scores by time decay weightings, proximity weightings, and frequency weightings determined for the remote words, wherein higher time decay weightings, higher proximity weightings, and higher frequency weightings increase relevancy scores of the remote words over lower than lower time decay weightings, lower proximity weightings, and lower frequency weightings, respectively.

14. The system of claim 13, wherein the operations further comprise:
processing a remote word in a data stream from a remote device;
adding the processed remote word to a remote word corpus in response to the remote word corpus not including the processed remote word;

setting a frequency use for the processed remote word to one in response to adding the processed remote word to the remote word corpus;

incrementing the frequency use of the processed remote word in response to the remote word corpus already including the processed remote word;

setting a time for the processed remote word to a time the processed remote word was included in the data stream; and setting a proximity to a distance between the system and the remote device providing the data stream including the processed remote word.

15. A method for autocorrecting text at a computer device, comprising:

accessing remote words included in at least one data stream in at least one remote device from over a network to store in a remote word corpus;

receiving user input text into a text entry field in a user interface rendered by the computer device;

maintaining local words in a local word corpus stored in the computer device;

determining a set of possible correct words for the user input text from the local and remote words;

determining relevancy scores of the local and remote words in the set of possible correct words;

determining a proximity weighting based on a distance between the remote device providing the data stream including the remote words and the computer device, wherein remote words from a data stream in a remote device having a smaller distance to the remote device have a higher proximity weighting than remote words in a remote device at a greater distance from the computer device;

adjusting the relevancy scores of the remote words in the set of possible correct words by the proximity weighting, wherein higher proximity weightings increases the relevancy scores of the remote words more than lower proximity weightings; and using the adjusted relevancy scores of the remote words to determine a subset of the set of possible correct words to present in the user interface to autocorrect and validate the user input text.

16. The method of claim 15, wherein the using the local and remote words to validate the user input text comprises:

determining whether the user input text matches a local word in the local word corpus;

determining whether the user input text matches a remote word in the remote word corpus; and validating the user input text in response to determining that the user input text matches one of the local words or the remote words.

17. The method of claim 15, wherein the using the local and remote words to autocorrect the user input text comprises:

rendering in the user interface at the computer device the subset of the set of possible correct words for a user to select for the user input text;

receiving user selection of a word comprising one of the subset of the set of possible correct words; and replacing the user input text with a user selected word of the subset of the set of possible correct words.

18. The method of claim 17, further comprising:

including the user selected word in the local word corpus; and including a remote word from the at least one data stream into the local word corpus in response to the remote word matching the user input text.

19. The method of claim 15, wherein the at least one data stream is formed by adding words rendered at the at least one remote device as the words are being rendered in the at least one remote device.

20. The method of claim 15, further comprising:

determining, for each of the remote words in the set of possible correct words, a time decay weighting based on a difference of an entry time of the user input text and a remote processing time at which a remote word was added to the at least one data stream, wherein remote words having a lower difference value have a higher time decay weighting than remote words having a higher difference value; and determining, for each of the remote words in the set of possible correct words, a frequency weighting based on a number of instances of a remote word in the at least one data stream, wherein remote words having a higher frequency in the data stream have a higher frequency weighting than remote words having a lower frequency in the data stream, wherein the adjusting the relevancy scores of the remote words in the set of possible correct words by the proximity weighting comprises adjusting the relevancy scores by time decay weightings, proximity weightings, and frequency weightings determined for the remote words, wherein higher time decay weightings, higher proximity weightings, and higher frequency weightings increase relevancy scores of the remote words over lower than lower time decay weightings, lower proximity weightings, and lower frequency weightings, respectively.

21. The method of claim 15, further comprising:

processing a remote word in a data stream from a remote device;

adding the processed remote word to a remote word corpus in response to the remote word corpus not including the processed remote word;

setting a frequency use for the processed remote word to one in response to adding the processed remote word to the remote word corpus;

incrementing the frequency use of the processed remote word in response to the remote word corpus already including the processed remote word;

setting a time for the processed remote word to a time the processed remote word was included in the data stream; and setting a proximity to a distance between the computer device and the remote device providing the data stream including the processed remote word.

* * * * *